July 4, 1972   P. A. PLASSE   3,674,622

NOVEL LAMINATING MEDIA

Filed July 14, 1969

INVENTOR.
PAUL A. PLASSE

BY Brown and Mikulka
and
John P. Morley
ATTORNEYS 3,674,622
NOVEL LAMINATING MEDIA
Paul A. Plasse, Lexington, Mass., assignor to Polaroid Corporation, Cambridge, Mass.
Filed July 14, 1969, Ser. No. 841,258
Int. Cl. B32b *3/26, 5/18*; G09f *3/02*
U.S. Cl. 161—160                                          7 Claims

ABSTRACT OF THE DISCLOSURE

Novel laminating media especially useful in combination with data storage media to provide laminated articles such as credit cards, identification cards or the like of improved performance characteristics as well as improved overall aesthetics. The novel laminating media essentially comprise a substrate coated with a layer of a compressible material having an adherent capability.

BACKGROUND OF THE INVENTION

Part 1.—The field of the invention

The present invention relates to novel laminating media. More precisely, the invention disclosed herein relates to novel laminating media and to laminar assemblies utilizing same to provide improved laminated articles such as the type employed as identification cards and credit cards or the like.

Part 2.—Description of the prior art

Laminating media are known to the art, being useful products of commerce which can be assembled with data storage media to provide laminated articles routinely employed as credit cards or identification cards or the like. Essentially, such laminated articles comprise a laminating medium, e.g., a transparent sheet-like, element or film or layer, bonded to a data storage medium. However, generally, such laminated articles involve an assembly of a data storage medium bonded between laminating media at least one of which is usually pellucid, e.g., transparent or translucent.

Bonding can be achieved by adhesives known to the art such as the diverse pressure-sensitive or heat-activatable adhesives. In some instances, the adhesive can be applied directly to the laminating medium and/or the data storage medium at the time of assembly. However, more often than not the adhesive is integrated with a substrate prior to assembly to provide a laminating medium which is available for immediate use in the assembly of laminated articles.

Laminated articles comprising data storage media and laminating media of the type discussed above are routinely produced in manners well-known to the art. Normally heat and/or pressure are involved in assembling the final laminated article but specific manners, methods and/or devices employed need not be discussed in detail herein. These procedures, methods and devices as well as the manners of operating same are well-known to those skilled in the art to which the present invention pertains.

One of the requirements of laminated articles employed as credit cards or identification cards or the like, is that the article be substantially flat; e.g., the article have a substantially uniform overall thickness. A substantially uniform thickness is a requisite for example, for credit or identification cards which are submitted to reading devices such as those employing mechanical fingers or the like.

The production of laminated articles having a substantially uniform overall thickness is not without attendant problems and specialized approaches are required. For example, those skilled in the art will recognize that a laminated article of substantially uniform overall thickness cannot be conveniently obtained in conventional laminar assemblies. This is especially true in such assemblies wherein the overall length and width of the laminating media exceed those of the data storage medium (card) interposed therebetween. In such a circumstance the geometry of the assembly is such that diffentials in thickness will be obtained between the portions of the final article occupied by the data storage medium and the peripheral portions which form the boundary about the card.

One approach to the production of laminated articles of substantially uniform thickness involves the assembly of data storage media and laminating media of approximately the same overall dimensions. However, articles produced from such assemblies oftentimes manifest poor adhesion at the peripheral portions of the article.

Another approach essentially involves the use of laminating media provided with elevated borders extending about the periphery thereof. The thickness of the border is substantially the same as the thickness of the data storage medium. Accordingly, the data storage medium can be placed within the confines of the border and covered with a transparent layer for example, to provide a laminated article of substantially uniform overall thickness. This approach requires careful control over the dimensions of the data storage medium and the border. If the data storage medium is too large it cannot be used whereas if it is too small a cavity is oftentimes produced which extends about the periphery of the medium. The cavity is unslightly and also reduces the overall effective bonding surface of the laminated article. Also, the employment of such laminating media as described above generally requires the separate and inconvenient application of adhesive to the borders and to the portion of the medium within the borders.

The present invention provides a novel solution to problems attendant with the production of laminated articles of substantially uniform overall thickness. Essentially the invention resides in a novel laminar medium and to the process for providing novel laminated articles from improved assemblies employing the novel medium, all of which will be discussed and described fully in the present specification in conjunction with the accompanying drawings.

SUMMARY OF THE INVENTION

In accordance with one of the objects of the present invention, a novel laminar medium useful in providing improved laminar assemblies is presented to the art. In accordance with another object of the invention, a process is presented involving a novel integration of a sequence of steps as applied to particular elements of laminar assemblies to provide novel laminated articles.

A novel laminating medium of the present invention essentially comprises a substrate integrated wtih a sheet, layer or film of a compressible material. Another especially preferred feature of the novel medium is that it have an adherent capability, preferably in the form of a thin layer or film uniformly overcoating said compressible material.

The substrate of the novel laminating media of the present invention can be any of the transparent, translucent or opaque sheet materials known to the art as useful substrates for laminating media. The sheet material may be flexible, rigid or semi-rigid, as desired. Suitable sheet materials include those of glass or the like as well as those fabricated of rigid, semi-rigid or flexible plastomeric materials. Moreover, the sheet materials can be pigmented or non-pigmented. An especially suitable plastomeric sheet material is one fabricated of polyvinyl chloride.

The compressible material coated on the substrate in the form of a sheet, layer or film of substantially uniform thickness is best described as a material having an internal structure of interconnected voids or pores. Such compressible materials are known to the art. Suitable compressible materials are best identified by their response to a vertical compressive force. If a vertical compressive force is applied to a surface of a layer of a material suitable in the practise of the present invention, the material will be compressed mainly in the vertical direction. For example, after compression the material will evidence little, if any, lateral response to the vertical compressive force.

Polystyrene foams or polyurethane foams, some of which inherently have an adherent capability, are the best examples of suitable compressible materials. However, others which have similar compressibility properties can be suitably employed. The compressibility of such foams arises by reason of the internal porous structure of the foam. Some for example have an internal porous structure that is somewhat rigid but the structure is fragile and will collapse or compress under pressure. Others have an internal porous structure which is somewhat resilient but which will compress under pressure. The thickness of the coating or layer of the compressible material can vary. However, the layer must be at least thick enough to provide sufficient void or pore volume to completely accommodate a data storage medium compressed thereinto. Accordingly, in almost all instances the layer of compressible material must be at least as thick as the data storage medium and preferably, the layer is at least slightly thicker.

Adhesives routinely employed in the production of laminated articles can be applied to the coating or layer of the above-described polymeric material in manners known to the art. Suitable adhesives useful in the practise of the present invention include the heat-activated adhesives, pressure activated adhesives, water activated adhesives, hot melt adhesives and the like. Especially preferred are the pressure sensitive adhesives. In accordance with the especially preferred embodiment of the present invention, the adhesive coating or layer on the polymeric material should be no thicker than required to obtain maximum adhesive performance characteristics. For example, oftentimes the thickness can be in the order of 1 mil but can be less than 0.5 mil if desired.

As mentioned before, some of the compressible materials suitable in the practise of the present invention inherently have an adherent capability. Such materials are in effect, foamed adhesives as are those which have been provided with an adherent capability during the production thereof. When such materials are involved, the employment of a discrete layer of adhesive can be dispensed with if desired.

A better and fuller understanding of the nature and objects of the invention as well as details relating to the practise of same will be obtained by reference to the following detailed description taken in connection with the accompanying drawings wherein.

Figure 1:
FIG. 1 is a cross-section of a laminating medium of the present invention.

Referring now to FIG. 1, a laminating medium of the present invention comprises a substrate 2, which may be essentially a sheet fabricated of a plastic such as those mentioned hereinbefore. Associated with substrate 2 is layer or coating 4 of a compressible material. As stated, layer 4 can be bonded in the form of a sheet to substrate 2 by an adhesive (not shown) or it can be cast in the form of a thin layer on substrate 2. If layer 4 lacks an adherent capability, a relatively thin layer of adhesive 6 may then be applied to layer 4 to provide the novel laminating medium.

As stated before, the many diverse adhesives known to those skilled in the laminating art can be employed in the practise of the present invention. However, in order to obtain the best balance of adhesive performance characteristics, the thickness of adhesive layer 6—when such is involved—should not exceed about 1 mil. The thickness of layers 2 and 4, however, can vary. Illustrative dimensions for the thickness of layer 2 can be between 1 to 10 mils or higher while the thickness of layer 4 can be 9 to 25 mils for example. In laminating media of the type illustrated in FIG. 1, a conventional release sheet (not shown) is oftentimes provided over adhesive layer 6 to prevent premature adhesion.

A laminating medium of the type illustrated in FIG. 1 can be advantageously employed in combination with a data storage medium to provide laminated articles of substantially uniform overall thickness as well as of improved overall bonding characteristics and aesthetics. These advantages will be better appreciated by reference to FIG. 2.

Figure 2:
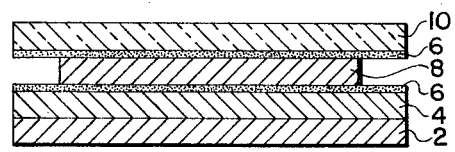
FIG. 2 is a cross-section of a laminar assembly employing a laminating medium of the present invention.

Referring now to FIG. 2, a laminar assembly is shown wherein a data storage medium 8 is interposed between a laminating medium of the present invention (layers 2, 4 and 6) and another laminating medium comprising a transparent layer 10 and adhesive layer 6. In the assembly shown, layers 6 are layers of a pressure sensitive adhesive. By way of illustration only, the overall thickness of the laminating medium produced from the assembly of FIG. 2 will be 31 mils. The thickness of 2 for example being 15 mils, the thickness of 4 being 10 mils and the thickness of 6 being 0.5 mil. The thickness of 10 is 5 mils while the thickness of its adhesive layer 6 is 0.5 mil.

It is to be understood that the thickness of medium 8 and the respective thicknesses of the laminating media (layers 2, 4 and 6, layers 10 and 6) can vary over a wide range subject only to the aforementioned restriction e.g., that the thickness of layer 4 provide sufficient void volume to accommodate data storage medium (card) 8. However, in the especially preferred embodiment of the present invention, the adhesive layers 6 should be less than about 1 mil and can be less than 0.5 mil if desired.

Figure 3:
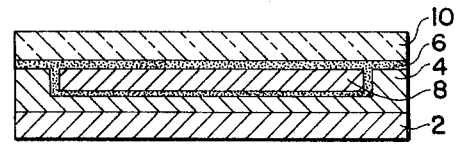
FIG. 3 is a cross-section of a laminated article produced from the assembly of FIG. 2.

Upon the application of pressure to the assembly of FIG. 2, data storage medium 8 is compressed into compressible polymeric layer 4 thereby providing a final laminated article of substantially uniform overall thickness as shown in FIG. 3. As can be seen from FIG. 3, by compressing data storage medium into the compressible polymeric layer 4 a depression is formed therein which closely accommodates data storage medium 4. This close accommodation of data storage medium 4 eliminates the possibility of any unsightly cavity being formed about the periphery of medium 4. Also, the close accommodation assures the maximum adhesive bonding surface for the final laminated article.

Suitable pressure can be applied to the assembly by way of a two roll mill or a platen press. If a heat activatable adhesive is involved, heating means is obviously needed.

DESCRIPTION OF PREFERRED EMBODIMENTS

The practise of the present invention provides improved laminated articles of the type commonly employed as identification cards. In a typical procedure involving the practise of the present invention, the issuer is provided with a plurality of laminating media of the type described hereinbefore and a data storage medium containing a photograph of the bearer as well as specific information pertaining to him.

One particularly useful and hence preferred system for preparing data storage mediums utilizes the principles of photography known as diffusion transfer. In such photographic systems either a black-and-white or a color print may be obtained, depending upon the particular photographic procedures employed. For example, blackand-white images may be obtained in accordance with the silver transfer procedures described and claimed in U.S. Pats. Nos. 2,543,181 and 2,647,056 issued to Edwin H. Land. Color transfer images may be obtained in accordance with the procedures described and claimed in U.S. Pat. No. 2,983,606, issued to Howard G. Rogers.

Figure 4:
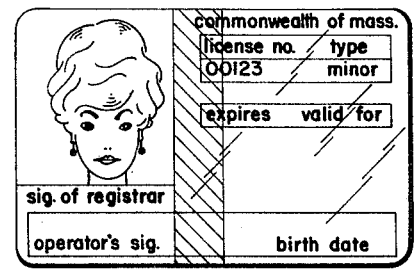
FIG. 4 is a plane view of an identification card which is laminated in a preferred embodiment of the present invention.

In a particularly suitable system for preparing data storage medium utilizing one of the aforementioned diffusion transfer processes, a data card containing the desired descriptive information is inserted into the camera so that both the subject and the descriptive matter pertaining to him are simultaneously photographed to provide a single developable image. The card is thereafter processed to provide a transfer print comprising a suitable support having thereon an image-bearing layer containing an image of the subject at one portion thereof and the descriptive matter at another portion thereof. The aforementioned procedure for preparing the photograph can be accomplished most expeditiously with a Polaroid ID-2 Land Identification System. FIG. 4 illustrates an identification card produced in accordance with the above-described procedure.

In any event, regardless of how the data storage medium is prepared, it is then assembled with a novel laminating medium of the type described herein.

The following illustrative examples are presented so that manners of making and using the present invention can be better understood and appreciated.

Example I

The following illustrates a method for producing laminating media of the type illustrated in FIG. 1.

A substrate is prepared by applying a pressure sensitive adhesive coating 1 mil thick to one surface of a commercially available opaque polyvinyl chloride sheet material conventionally employed in the production of credit or I.D. cards. The sheet material is about 15 mils thick, and approximately 2 5/16" x 3 1/4". A commercially available sheet of polyurethane foam 10 mils thick and also approximately 2 5/16" x 3 1/4" is laminated to the adhesive layer of the polyvinyl chloride substrate. A coating of a pressure-sensitive adhesive about 1 mil thick is then applied to the polyurethane layer to provide a laminating medium of the type illustrated in FIG. 1.

Example II

The following illustrates a method for producing a laminated article of the type illustrated in FIGS. 3 and 4.

Polacolor Type 108 Land film was inserted into the No. 926 Land Identification System. A data card was then inserted and this card and the subject were simultaneously photographed to provide a developable image on the photosensitive element of the film. The exposed photosensitive element was then pulled from the camera while in superposition with the image-receiving element of the film, the two elements were maintained in superposition outside the camera for approximately 60 seconds and then separated to reveal a positive multicolor transfer image. The resulting data storage medium was about 9 mils thick and approximately 1 3/4" x 2 3/4". While still somewhat moist, the data storage medium was placed between the laminating medium of Example I and a transparent butyrate sheet material so that data of the data storage medium is visible through the transparent butyrate sheet. The transparent sheet material is 5 mils thick and approximately 2 1/8" x 3 3/8" and associated with one surface thereof is a coating about 0.1 mil thick of a polyvinyl acetate, water activatable adhesive.

The laminar assembly is then passed through a two roll mill to provide a final laminated article of the type illustrated in FIG. 3.

Upon examination, the final laminated article was of a uniform overall thickness and manifested performance characteristics and properties consistent with excellent adhesion between the components of the laminar assembly. Moreover no cavity was visible about the periphery of the interposed data storage medium.

Many modifications in incidental details offered in the above examples for the purposes of illustrating the invention can be employed without departing from the spirit and scope of the invention defined in the appended claims.

Also, certain changes may be made in the above disclosed novel laminating media, laminated articles and process for producing same. Accordingly, it is intended that all matter contained in the above description or shown in the accompanying drawings shall be interpreted as illustrative and not in a limiting sense.

What is claimed is:

1. A laminate comprising a laminating medium which comprises a substrate carrying on one surface thereof a continuous coating of a compressible polymeric foam material the surface of which is overcoated with an adhesive layer, a data storage medium adhered to said adhesive layer said data storage medium having an information-bearing surface opposed to that surface thereof adhered to said compressible foam material, said data storage medium further being compressed into said compressible foam material so that the overall dimensions including the thickness of said data storage medium are accommodated by said compressible material.

2. A laminate of claim 1 further including a transparent layer adhered to the information-bearing surface of the data storage medium.

3. A laminate of claim 2 wherein said information-bearing surface comprises a silver halide diffusion transfer image pattern and wherein said transparent layer is adhered to said information-bearing surface by way of a water activated polyvinyl acetate adhesive.

4. A laminate of claim 2 wherein said information-bearing surface of said data storage medium comprises a color diffusion transfer image pattern and said transparent layer is laminated to said information-bearing surface by way of a water activated polyvinyl acetate adhesive.

5. A laminate of claim 1 wherein said compressible material is a polymeric foam selected from the group consisting of polystyrene foams, polymethane foams and mixtures of these.

6. A laminate of claim 1 wherein said compressible material is coated with an adhesive layer no greater than about 1 mil thick.

7. A laminate of claim 1 wherein said adhesive layer comprises a pressure sensitive adhesive.

References Cited

UNITED STATES PATENTS

| | | | |
|---|---|---|---|
| 3,457,661 | 7/1969 | Peters | 40—2.2 |
| 3,461,581 | 8/1969 | Hoffmann | 283—7 |
| 3,520,758 | 7/1970 | Wiest | 40—2.2 |
| 3,173,826 | 3/1965 | Campbell et al. | 161—167 |
| 3,311,338 | 3/1967 | Culley | 161—167 |
| 3,413,171 | 11/1968 | Hannon | 161—6 |

WILLIAM J. VAN BALEN, Primary Examiner

U.S. Cl. X.R.

40—2.2; 156—277; 161—5, 6, 167, 406, 413